(12) United States Patent
Altfeld

(10) Patent No.: US 6,976,247 B1
(45) Date of Patent: Dec. 13, 2005

(54) GENERATING AN EXECUTABLE FILE

(75) Inventor: Helge Altfeld, Munich (DE)

(73) Assignee: Infineon Technologies AG, Munich (DE)

( * ) Notice: Subject to any disclaimer, the term of this patent is extended or adjusted under 35 U.S.C. 154(b) by 664 days.

(21) Appl. No.: 10/057,500

(22) Filed: Jan. 25, 2002

(51) Int. Cl.⁷ .................................................. G06F 9/45
(52) U.S. Cl. ....................................................... 717/140
(58) Field of Search ........................ 717/140; 709/217

(56) References Cited

U.S. PATENT DOCUMENTS

| 6,389,460 B1 * | 5/2002 | Stewart et al. ............... 709/217 |
| 6,675,214 B2 * | 1/2004 | Stewart et al. ............... 709/226 |

* cited by examiner

Primary Examiner—John Chavis
(74) Attorney, Agent, or Firm—Fish & Richardson P.C.

(57) ABSTRACT

A method of generating an executable file includes subdividing a target name into portions at one or more predetermined points. The method also includes saving at least one portion as a list variable. The method may also include determining if the target name can be further subdivided at one or more delimiters.

21 Claims, 2 Drawing Sheets

GENERATING AN EXECUTABLE FILE

TECHNICAL FIELD

This invention relates to software development and in particular to generating an executable image using a makefile.

BACKGROUND

Typically, in software development, a set of tools is used to transform source-code into an executable program. A typical tool set includes a preprocessor, a compiler, an assembler, and a linker. After a developer writes the source code, a preprocessor prepares the code for the compiler. The preparation consists typically of replacing macros by their macro definition, of resolving "include" statements by including other components or of cleaning-out comment lines. Afterwards, a compiler compiles it. The source code is typically made-up of one or more source files written in a higher-level language. The compiler translates these source files into a lower-level language. For example, a C language compiler converts a source file in C language, a high-level language, to assembly language, a lower-level language. Typically, a command to start the compiler includes conditions the compiler uses to process the code.

The assembler then converts the assembly language code into object files. Object files include object code that a computer understands directly. In the final stage of development, the linker links the object files both to each other and to code libraries that contain built-in functions. The result of this linking operation is an executable file.

Typically, compiling larger programs takes much longer than compiling short programs. In most cases, between compilations, only a small section of the source code is actually modified; the rest of the source code remains unchanged. A "make" command tracks which portions of the source code have been changed and compiles only those portions of the source code that have changed since the last compilation.

To effectively use the "make" command, particularly when many source code files are to be combined, a file called a "makefile" is written. The makefile describes the relationships among the constituent files of the program and provides commands for updating each file. The makefile determines the relationships between source files, object files and the executable file. Once a suitable makefile exists, each time the source files change, the "make" command performs all the necessary compilations.

SUMMARY

In one aspect the invention is a method of generating an executable file. The method includes subdividing a target name into portions at one or more predetermined points and saving at least one portion as a list variable.

This aspect may include one or more of the following features. Subdividing includes identifying the predetermined points by detecting a first character sequence that separates compiler conditions. Detecting the first character sequence includes detecting an underscore. Subdividing includes identifying the predetermined points by detecting a second character sequence where the second character sequence separates run-set components. Detecting the second character sequence includes detecting a period. Saving at least one portion includes using the list variable as a run-set component. Saving at least one portion includes using the list variable as a manufacturing-set component. Saving at least one portion includes using the list variable as a compiler condition. The method includes determining that the target name can be further subdivided at one or more delimiters. The method includes using the list variable as a dependency. The method includes using the list variable as a declared object. The method includes transforming the list variable to have a compiler specific prefix.

In another aspect the invention is an apparatus that includes a memory that stores executable instructions for generating an executable file using a computer language and a processor. The processor executes instructions to subdivide a target name into subparts at one or more predetermined points and to save at least one subpart as a list variable.

This aspect may have one or more of the following features. Instructions to subdivide includes instructions to identify the predetermined points by detecting a first character sequence, which separates compiler conditions. Detecting the first character sequence includes detecting an underscore. Instructions to subdivide includes instructions to identify the predetermined points by detecting a second character sequence, which separates run-set components. Detecting the second character sequence includes detecting a period. Instructions to save at least one portion include instructions to use the list variable as a run-set component. Instructions to save at least one portion includes instructions to use the list variable as a manufacturing-set component. Instructions to save at least one portion includes instructions to use the list variable as a compiler condition. The processor executes instructions to determine that the target name can be further subdivided at one or more delimiters. The processor executes instructions to use the list variable as a dependency. The processor executes instructions to use the list variable as a declared object. The processor executes instructions to transform the list variable to have a compiler specific prefix.

In still another aspect, the invention is an article that includes a machine-readable medium that stores executable instructions for generating an executable file. The instructions cause a machine to subdivide a target name into subparts at one or more predetermined points and to save at least one subpart as a list variable.

This aspect may have one or more of the following features. Instructions to subdivide include instructions causing a machine to identify the predetermined points by detecting a first character sequence, which separates compiler conditions. Instructions to detect the first character sequence comprise instructions causing a machine to detect an underscore. Instructions to subdivide include instructions causing a machine to identify the predetermined points by detecting a second character sequence, which separates run-set components. Instructions to detect the second character sequence includes instructions causing a machine to detect a period. Instructions to save at least one portion include instructions causing a machine to use the list variable as a run-set component. Instructions to save at least one portion includes instructions causing a machine to use the list variable as a manufacturing-set component. Instructions to save at least one portion includes instructions causing a machine to use the list variable as a compiler condition. Instructions to determine that the target name can be further subdivided at one or more delimiters. Instructions to use the list variable as a dependency. Instructions to use the list variable as a declared object. Instructions to transform the list variable to have a compiler specific prefix.

Some or all of the aspects of the invention described above may have some or all of the following advantages. The invention allows for the automatic creation of executable files, without the need for a user to enter a line for each and every run set. The invention automatically generates calls to a compiler for all combinations of run-set components and manufacturing process components whenever the run-set is described in a "makefile."

DETAILED DESCRIPTION

Figure 1:
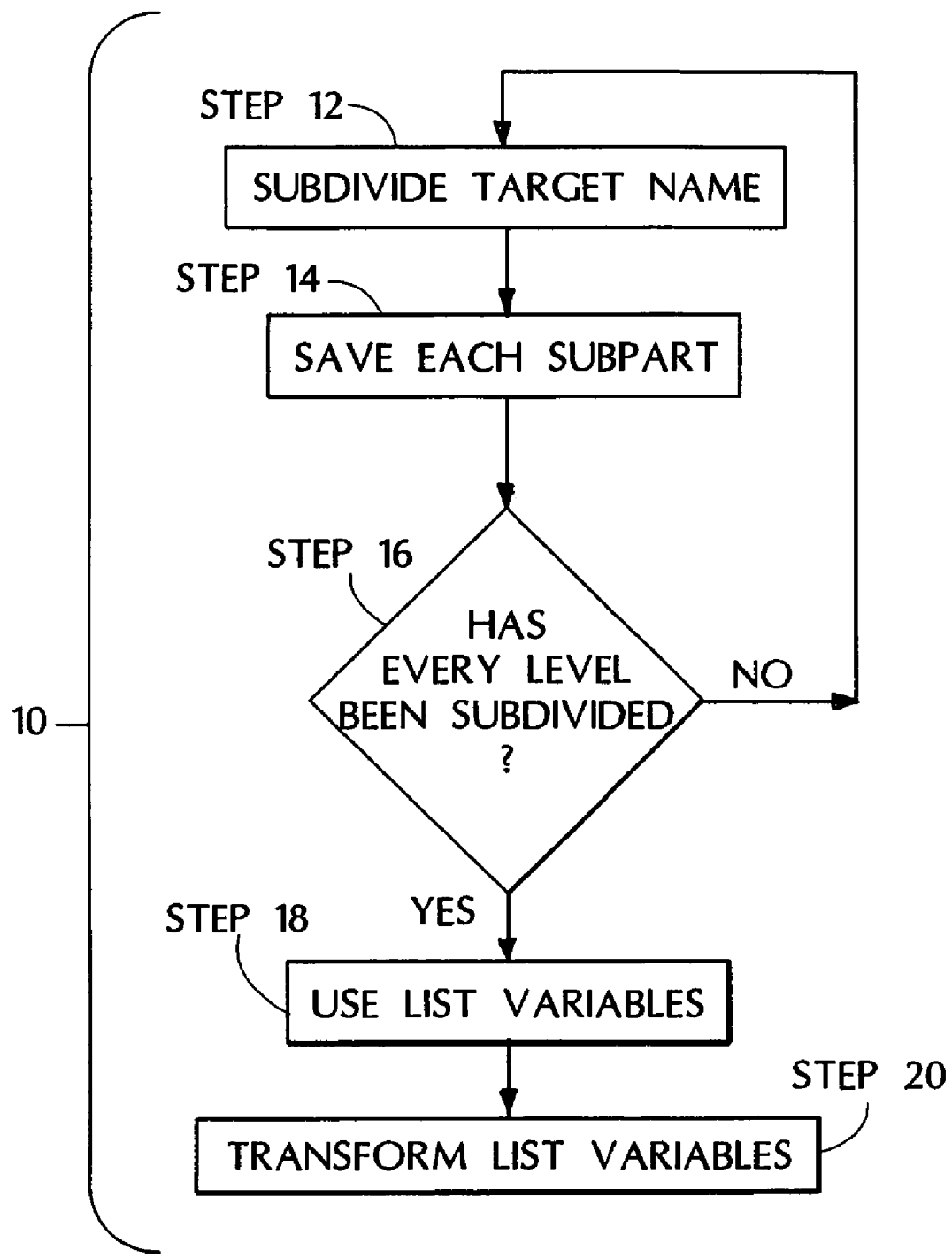
FIG. 1 is a flowchart for a process of generating an executable file.

Referring to FIG. 1, a process 10 is used to generate software code using a makefile. In particular, process 10 automatically generates all the calls to a compiler, (i.e., without a user writing a script for each component). Process 10 generates these calls on the basis of a name, herein referred to as the "target name," of the software to be generated.

In a compilation, a compiler is called to process the source files. At the same time, the compiler is assigned compiler conditions that the compiler uses during compilation. Compiler conditions are also known as compiler flags and compiler switches. All the calls to a compiler are written into a run script, for example, in a "makefile." However, the run scripts that control the code generation require that the compiler conditions and the source file names both be included and written directly into the run script.

Manually writing the compiler conditions and the source file names into the run scripts is an error prone task because of the amount of information to be entered. This is especially true if there are multiple components with multiple source file variations.

For example, it is difficult to change configuration scripts (run sets) for verifying the physical design of a semiconductor in response to changes in manufacturing technology. In this example, each semiconductor manufacturing technology (e.g., C9D1, C10D0, and C10D1) has an associated set of verification run-set types (e.g., drc, extract, and lvs). Each run-set contains: a run-set component that uniquely defines the type of run-set; and a manufacturing-process component that uniquely defines the manufacturing technology. Thus, there exists a run-set of source file combinations. For example, three different manufacturing-process components and three types of run-set components can be represented in a run-set as follows:

| Components | C9D1.defs | C10D0.defs | C10D1.defs |
|---|---|---|---|
| Drc.source | C9D1.drc.rul | C10D0.drc.rul | C10D1.drc.rul |
| Extract.source | C9D1.extract.rul | C10D0.extract.rul | C10D1.extract.rul |
| LVS.source | C9D1.lvs.rul | C10D0.lvs.rul | C10D1.lvs.rul |

Without process 10, a developer would have to enter a line in the makefile for each of the run sets. In the example above, there are nine run-set entries that describe the relationship between each type of run set component and each manufacturing-process component. Without process 10, a developer would have to change three lines of the run-script for every added manufacturing process. However, process 10 automatically generates the calls to a compiler for all the combinations of run-set components and manufacturing process components whenever a run-set is described in a "makefile".

Process 10 relies on two underlying assumptions. First, the target name, contains a unique reference to a source file and/or a compiler condition. For example, in the example above, there is only one manufacturing process labeled C10D0. Second, the software components to be varied and the compiler conditions have a unique relationship. In the example above, each manufacturing process has three types of source files for each of the run sets, e.g., *.drc, *.extract, and *.lvs.

Process 10 subdivides (12) the target name along pre-specified points. For example, consider the target name "C10DD0_PROPC_CDS.drc.rul." Process 10 separates the target name into five parts: "C10DD0," "PROPC," "CDS," "drc," and "rul". The first part of any target name is labeled a component by default and the last part is disregarded since it designates a file type. Of the remaining parts, process 10 takes the parts preceded by a period and treats that part as a component. Then, parts preceded by an underscore are labeled as compiler conditions. The foregoing target name thus has two compiler conditions (PROPC, CDS) and two components(C10DD0, drc).

Process 10 saves (14) one or more parts of the target name as a list variable, for example, TECH="C10DD0" and PURPOSE="drc." Process 10 need not make each part of the target name equal to a list variable. For example, process 10 can make a list variable, TECHSWITCH equal to "PROPC CDS" so that two parts are used in one list variable definition.

Process 10 determines (16) if the parts of the target name can be further subdivided into subparts. If so, process 10 further subdivides (12) the target name and saves (14) subparts of the target name as additional list variables. For example, TECH="C10DD0" can be further segmented at a delimiter "DD" so that new list variables can be assigned. For example, MAJORTECH="10" and MINORTECH="0".

Process 10 uses (18) the list variables to represent the components as a dependency or as a declared object or a combination of both. Dependencies are files, which are used within the compilation and thus will be checked by the "make" mechanism in advance. The dependency is a name coming from the "make" description. A declared object is the source file upon which the compiler operates. For example, as a target-line, the following is placed in a makefile:

*.rul::TECH.definition PURPOSE.source SHAREDFILES
   cpp                                    -DSTEP=MAJORTECH
    -DREVISION=MINORTECH PURPOSE.source where PURPOSE.source is the declared object, TECH.definition, PURPOSE.source, and SHAREDFILES are dependencies, and cpp represents the C preprocessor. The example above results in the extracted components "C10DD10.defs" and "drc.source" being used for compiling. The part of the target name "C10DD0" is put into the variable "TECH," the part of the target name "drc" is put into the variable "PURPOSE." These variables are combined with the respective file-endings and used within the preprocessor-call as file names. In the example above, the "-D" option is equivalent to a "#define" within the source code.

Process 10 transforms (20) the list variables representing compiler conditions by adding a compiler specific prefix. For example, each component of TECHSWITCH will be preceded with a compiler specific option-sign (within a loop). Assuming the specific option is "-D" then the list TECHSWITCH="PROPC CDS" will be transformed to TECHSWITCH="-DPROPC -DCDS." This modified list is then handed over to the compiler in the call-line, i.e., cpp . . . TECHSWITCH PURPOSE.source.

The following example is an example of code that uses process 10:

```
#definition of constant, to bypass limitations of the syntax,
KOMMA:=,
#The following lines extract out of the existing components
#usable targets
ALLPURPS:=$(patsubst RCS/%.source$(KOMMA)v,%,$(wildcard
    RCS/*.source*))
ALLTECHS:=$(patsubst RCS/%.defs$(KOMMA)v,%,$(wildcard
    RCS/*.defs*))
ALLTARGETS=$(foreach P1,$(ALLTECHS),$(foreach
    P2,$(ALLPURPS),$(P1).$(P2).rul))
#Definition of constant, to bypass limitations of the syntax:
Empty:=
SPACE:=$(EMPTY)$(EMPTY)
#Subdividing of the target name into its components
#Subdividing at the periods
COMPONENTS=$(subst.,$(SPACE),$@)
PURP=$(word 2,$(COMPONENTS))
FIRST=$(word 1,$(COMPONENTS))
#Subdividing of the first component at underscores
TCOMPONENTS=$(subst_,$(SPACE),$(FIRST))
TECH=$(word 1, $(TCOMPONENTS))
TSWITCH_EL=$(filter-out $(TECH), $(TCOMPONENTS))
#Transforming conditions into switches
TSWITCHES=$(foreach SW,$(TSWITCH_EL)-D$(SW)_
EXCEPTIONS
#Hierarchical invocation of the compiler with the conditions
#extracted above and components
all:$(ALLTARGETS)
$(ALLPURPS):%:$(foreach P1,$(ALLTECHS),$(P1).%.rul)
$(ALLTECHS):%:$(foreach P1,$(ALLPURPS),%.$(P1).rul)
#Since the Make does not interpret variables in the
#dependency-line, it must be recursive, so that these
#needed components are checked out from RCS
%.rul::FORCE
    @$(MAKE)$(PURP).source$(TECH) .defs Makefile
    cpp -D$(TECHG) -DTECHFILE=""$(TECH) .defs""$
    (TSWITCHES)
        $(PURP).source lgrep -v"ˆ#'>$@
#Fetch the most actual or not yet existing components from RCS
%::RCS/%,v
    co $<
```

Figure 2:
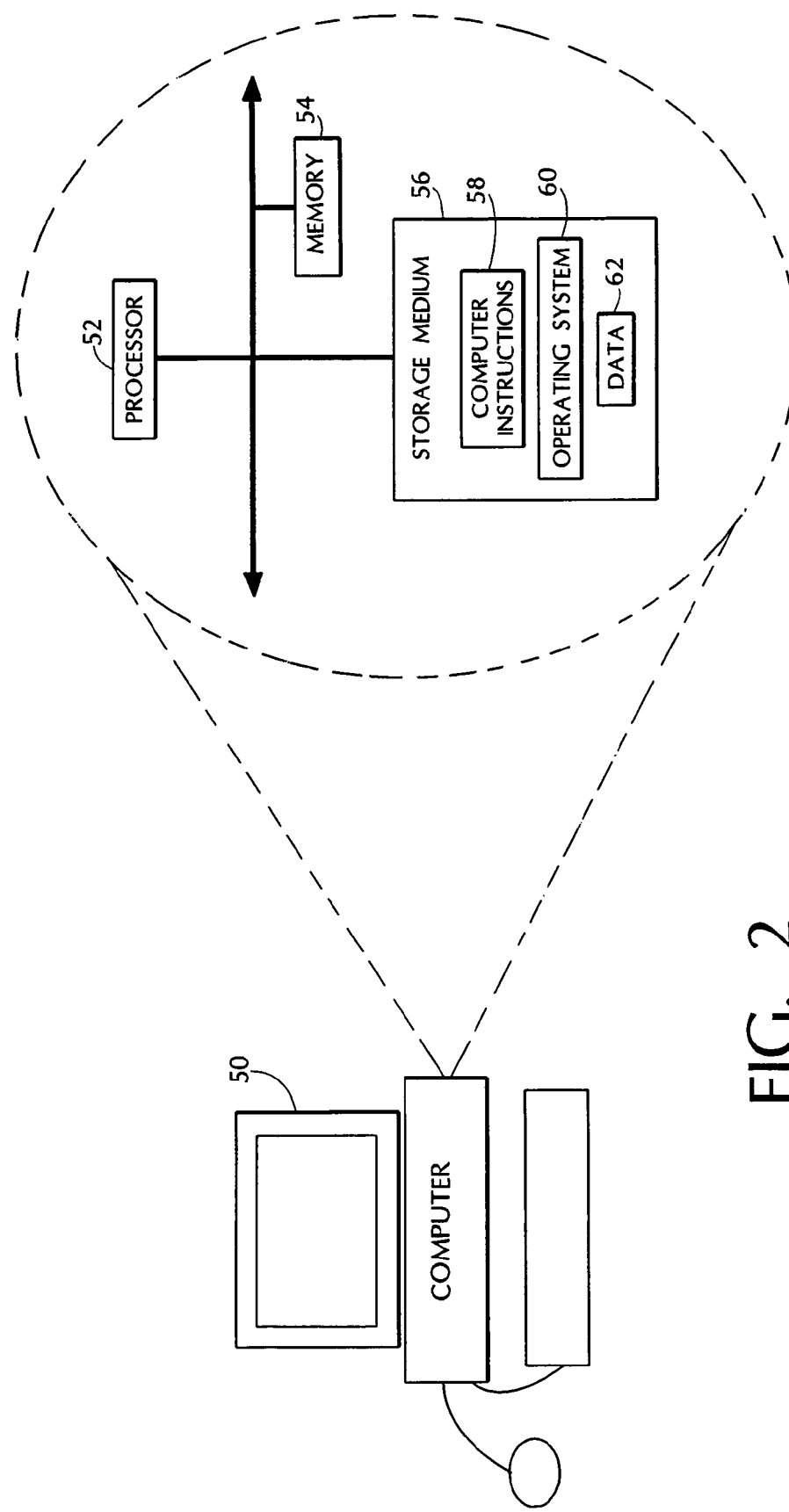
FIG. 2 is a block diagram of a computer system on which the process of FIG. 1 may be implemented.

FIG. 2 shows a computer 50 for generating software code using process 10. Computer 50 includes a processor 52 for processing software code, a memory 54, and a storage medium 56 (e.g., hard disk). Storage medium 56 stores operating system 60, data 62 for storing source files, object files and executable files, and computer instructions 58 to be executed by processor 52 to perform process 10.

Process 10 is not limited to use with the hardware and software of FIG. 2; it may find applicability in any computing or processing environment and with any type of machine that is capable of running a computer program. Process 10 may be implemented in hardware, software, or a combination of the two. Process 10 may be implemented in computer programs executed on programmable computers/machines that each include a processor, a storage medium/article readable by the processor (including volatile and non-volatile memory and/or storage components), at least one input device, and one or more output devices. Program code may be applied to data entered using an input device to perform process 10 and to generate output information.

Each such program may be implemented in a high level procedural or objected-oriented programming language to communicate with a computer system. However, the programs can be implemented in assembly or machine language. The language may be a compiled or an interpreted language. Each computer program may be stored on a storage medium (article) or device (e.g., CD-ROM, hard disk, or magnetic diskette) that is readable by a general or special purpose programmable computer for configuring and operating the computer when the storage medium or device is read by the computer to perform process 10. Process 10 may also be implemented as a machine-readable storage medium, configured with a computer program, where upon execution, instructions in the computer program cause the computer to operate in accordance with process 10.

The invention is not limited to the specific embodiments described herein. For example, process 10 can be modified for calls to a preprocessor instead of a compiler or be modified to include both. In addition, the invention is not limited to makefiles or the make command but also includes any software program that requires calls from multiple sources. The invention is not limited to the specific processing order of FIG. 1. Rather, the blocks of FIG. 1 may be re-ordered, as necessary, to achieve the results set forth above.

Other embodiments not described here are also within the scope of the following claims.

What is claimed is:

1. A method comprising:
   generating an executable file, wherein generating an executable file comprises:
      subdividing a target name into portions at one or more predetermined points,
   wherein subdividing the target name comprises:
      identifying at least one of the predetermined points by detecting a first character sequence, the first character sequence separating compiler conditions, wherein detecting the first character sequence comprises detecting an underscore;
      identifying at least one of the predetermined points by detecting a second character sequence, the second character sequence separating run-set components, wherein detecting the second character sequence comprises detecting a period, saving at least one of the portions as a list variable; and
      adding a compiler specific prefix to the list variable.

2. The method of claim 1, wherein saving at least one portion comprises using the list variable as a run-set component.

3. The method of claim 1, wherein saving at least one portion comprises using the list variable as a manufacturing-set component.

4. The method of claim 1, wherein saving at least one portion comprises using the list variable as a compiler condition.

5. The method of claim 1, further comprising determining that the target name can be further subdivided at one or more delimiters.

6. The method of claim 1, further comprising using the list variable as a dependency.

7. The method of claim 1, further comprising using the list variable as a declared object.

8. An apparatus comprising:
   a memory that stores executable instructions for generating software code using a computer language; and
   a processor that executes the instructions to:
      subdivide a target name into subparts at one or more predetermined points; wherein subdividing the target name comprises:

identifying at least one of the predetermined points by detecting a first character sequence, the first character sequence separating compiler conditions, wherein detecting the first character sequence comprises detecting an underscore;

identifying at least one of the predetermined points by detecting a second character sequence, the second character sequence separating run-set components, wherein detecting the second character sequence comprises detecting a period, save at least one of the subparts as a list variable; and add a compiler specific prefix to the list variable.

9. The apparatus of claim 8, wherein to save at least one portion comprises to use the list variable as a run-set component.

10. The apparatus of claim 8, wherein to save at least one portion comprises using the list variable as a manufacturing-set component.

11. The apparatus of claim 8, wherein to save at least one portion comprises using the list variable as a compiler condition.

12. The apparatus of claim 8, wherein the processor executes instructions to determine that the target name can be further subdivided at one or more delimiters.

13. The apparatus of claim 11, wherein the processor executes instructions to use the list variable as a dependency.

14. The apparatus of claim 11, wherein the processor executes instructions to use the list variable as a declared object.

15. An article comprising a machine-readable medium that stores executable instructions for generating an executable file, the instructions causing a machine to:

subdivide a target name into subparts at one or more predetermined points; wherein the instructions to subdivide the target name cosprise instructions to:

identify at least one of the predetermined points by detecting a first character sequence, the first character sequence separating compiler conditions, wherein detecting the first character sequence comprises detecting an underscore;

identify at least one of the predetermined points by detecting a second character sequence, the second character sequence separating run-set components, wherein detecting the second character sequence comprises detecting a period; save at least one of the subparts as a list variable; and add a compiler specific prefix to the list variable.

16. The article of claim 15, wherein the instructions causing the machine to save at least one portion comprise instructions causing the machine to use the list variable as a run-set component.

17. The article of claim 15, wherein the instructions causing the machine to save at least one portion comprise instructions causing the machine to use the list variable as a manufacturing-set component.

18. The article of claim 15, wherein the instructions causing the machine to save at least one portion comprise instructions causing the machine to use the list variable as a compiler condition.

19. The article of claim 15, further comprising instructions causing the machine to determine that the target name can be further subdivided at one or more delimiters.

20. The article of claim 18, further comprising instructions causing the machine to use the list variable as a dependency.

21. The article of claim 18, further comprising instructions causing the machine to use the list variable as a declared object.

* * * * *